United States Patent [19]
Cook et al.

[11] Patent Number: 5,592,678
[45] Date of Patent: Jan. 7, 1997

[54] DISPLAY ADAPTER SUPPORTING PRIORITY BASED FUNCTIONS

[75] Inventors: John A. Cook; Gregory A. Flurry; Larry W. Henson; Bruce R. Wood, all of Austin, Tex.

[73] Assignee: International Business Machines Corporation, Armonk, N.Y.

[21] Appl. No.: 336,716

[22] Filed: Nov. 9, 1994

Related U.S. Application Data

[63] Continuation of Ser. No. 734,428, Jul. 23, 1991, abandoned.

[51] Int. Cl.⁶ .................................................. G06F 13/00
[52] U.S. Cl. .................. 395/800; 364/237.2; 364/238.5; 364/239; 364/239.7; 364/244.8; 364/281.3; 364/DIG. 1
[58] Field of Search .................................... 395/250, 500, 395/882, 800, 427

[56] References Cited

U.S. PATENT DOCUMENTS

| | | | |
|---|---|---|---|
| 4,438,489 | 3/1984 | Heinrich et al. | |
| 4,555,775 | 11/1985 | Pike | |
| 4,651,146 | 3/1987 | Lucash et al. | |
| 4,653,020 | 3/1987 | Cheselka et al. | |
| 4,654,788 | 3/1987 | Boudreou et al. | 395/425 |
| 4,670,752 | 6/1987 | Marcoux | |
| 4,688,167 | 8/1987 | Agarwal | |
| 4,761,642 | 8/1988 | Huntzinger | |
| 4,780,709 | 10/1988 | Randall | |
| 4,783,648 | 11/1988 | Homma et al. | |
| 4,807,142 | 2/1989 | Agarwal | |
| 4,829,294 | 5/1989 | Iwami et al. | |
| 4,862,389 | 8/1989 | Takagi | |
| 4,870,406 | 9/1989 | Gupta et al. | 395/199 |
| 4,890,257 | 12/1989 | Anthias et al. | |
| 4,896,290 | 1/1990 | Rhodes et al. | |
| 4,914,607 | 4/1990 | Takanashi et al. | |
| 4,928,247 | 5/1990 | Doyle et al. | |
| 4,975,690 | 12/1990 | Torres | |
| 5,008,816 | 4/1991 | Fogg, Jr. et al. | 395/410 |
| 5,063,494 | 11/1991 | Davidowski et al. | 395/800 |
| 5,091,720 | 2/1992 | Wood | 340/721 |
| 5,113,517 | 5/1992 | Beard et al. | 395/500 |
| 5,208,908 | 5/1993 | Harrison et al. | 395/150 |

*Primary Examiner*—Kevin J. Teska
*Assistant Examiner*—Ayni Mohamed
*Attorney, Agent, or Firm*—Paul S. Drake; Velel Emile

[57] ABSTRACT

In a multitasking data processing apparatus including means for executing processes and including a display adapter for executing functions supporting a display, the display adapter including a first port means for receiving, from the means for executing processes, requests to execute selected functions having a first execution priority, a second port means for concurrently receiving, from the means for executing processes, requests to execute selected functions having a second execution priority lower than the first execution priority, and means, coupled to the first and second port means, for executing selected functions according to the execution priority. In addition, in a multitasking data processing apparatus including means for executing processes and including a display adapter for executing functions supporting a display, a method of executing processes including the steps of receiving from the means for executing processes in a first port means requests to execute selected functions, the requests having a first execution priority, concurrently receiving from the means for executing processes in a second port means requests to execute selected functions having a second execution priority lower than said first execution priority, and executing the selected functions according to the execution priority.

14 Claims, 8 Drawing Sheets

DISPLAY ADAPTER SUPPORTING PRIORITY BASED FUNCTIONS

This is a continuation of application Ser. No. 07/734,428 filed Jul 23, 1991 now abandoned.

RELATED PATENT APPLICATIONS

This patent application is related to copending patent application Ser. No. 07/734,397 filed Jul. 23, 1991, and now abandoned, entitled "Multiple Command Set Support for Rendering Components" hereby incorporated by reference; and patent application Ser. No. 07/734,427 filed Jul. 23, 1991, and now abandoned, entitled "Display Adapter Interface Layer" hereby incorporated by reference.

TECHNICAL FIELD

This invention relates to data processing systems and more specifically to data processing systems utilizing display adapters.

BACKGROUND OF THE INVENTION

Data processing systems commonly include peripheral devices that run concurrently with the operation of the data processing system. When several processes that are executing in the data processing system require access to the peripheral device, it is necessary to regulate access to the peripheral device. This is especially true in a data processing system that allows for processes to concurrently execute. One application of a data processing system requiring management of the peripheral device is a data processing system provided with a display adapter such as a graphics adapter. Commonly, processes that are executing in the data processing system provide data to a display adapter to display images and/or text to the user. These processes that are running concurrently on the data processing system must have their access to the display device regulated.

FIG. 1 is a block diagram of a typical digital computer 100 utilizing a display adapter to render images. The computer includes a host computer 105. The host computer includes main processor(s) 110 coupled to a memory 120, input device(s) 130 and output device(s) 140. Main processor(s) 110 may include a single processor or multiple processors. Input device(s) 130 may include a keyboard, mouse, tablet or other type of input devices. Output device(s) 140 may include a text monitor, plotter or other types of output devices. The main processor may also be coupled to output device(s) 150 such as a graphics display through a display adapter 200. The display adapter 200 receives instructions regarding images to be rendered from main processor 110. The display adapter then executes those instructions with display processor(s) 220 coupled to a display memory 230. The display processor(s) then execute(s) those instructions and updates frame buffer(s) 240 based on those instructions. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150, thereby rendering the desired image.

FIG. 2 is a block diagram of a host computer 300 utilizing a single domain display adapter 350 for rendering images. In host computer 300, a set of graphics processes 310 being executed by the host computer processor communicate with a display adapter 350 for rendering desired images. These graphics processes typically include processes initiated by two dimensional (2-D) and three dimensional (3-D) software packages that are often executed concurrently. These graphics processes may also include a kernel process initiated by the operating system or a server process initiated by a windowing system.

In the prior art, graphics processes 310 commonly coupled to graphics adapter 350 by a rendering context manager 330 (herein referred to as an RCM) in a serial fashion. In general terms, the RCM provides a mechanism such that each of the graphics processes utilizing the display adapter to render graphics images can do so without having to interface with any of the other graphics processes also utilizing the display adapter. Patent application Ser. No. 07/480,186 filed Feb. 12, 1990, now abandoned entitled "Rendering Context Manager for Display Adapters" discusses utilizing an RCM for communications between a host computer and a display adapter.

In this example, RCM 330 provides communications between graphics processes 310 and display adapter 350 through a single domain 360. A domain is a port for allowing information to pass between the host computer and the display adapter. A more detailed description of domains will be given with reference to FIG. 3 below. In a multitasking environment where multiple graphics processes may be executing simultaneously, the graphics processes must contend for the single pathway to the graphics adapter. This contention is handled by the RCM.

Functions 380 are available for execution in the display adapter processor upon request by graphics processes 310 through RCM 330 and domain 360. The functions include graphics functions, such as rendering a particular type of drawing primitive such as a triangle, performing display adapter housekeeping functions, such as clearing display adapter memory, as well as other types of functions.

FIG. 3 is a block diagram of a host computer 400 utilizing a multiple domain display adapter 450 for rendering images. In host computer 400, a set of graphics processes 410 being executed by the host computer processor communicate with display adapter 450 through RCM 430 and domains 460, 462, 464 and 466. In these communications, the graphics processes request the display adapter processor to execute functions 480, 4827 484 and 486. It is through executing these functions that display adapter 450 renders desired images on a display adapter.

Utilizing multiple domains to provide communications between a host computer and a display adapter is known in the art. Patent application Ser. No. 07/480,183 filed Feb. 12, 1990, now abandoned, entitled "Rendering Context Manager for Display Adapters Supporting Multiple Domains" discusses utilizing multiple domains for communications between a host computer RCM and a display adapter. A domain is a port for providing communications to a peripheral device such as a display adapter. Typically, multiple domains are allocations of addresses for use on a hardware port. These address allocations or domains are used in multitasking environments for concurrent communications between multiple host computer processes and a peripheral device.

In this example, graphics processes 410 are coupled by RCM 430 to domains 460, 462, 464 and 466. Four of the graphics processes may be connected to the graphics adapter at any one time by the RCM. The RCM accomplishes this connection from the graphics processes to the display adapter domains on demand. Since any of the graphics processes may be coupled to any of the domains, a complete set of functions must be available to be executed for each domain. This includes any kernel processes initiated by the operating system.

FIG. 4 is an illustration of a use of the system shown in FIG. 3. In this illustration, four of the graphics processes are coupled to four of the domains. In this example, X Server 412 is coupled to domain 462, DWA 414 is coupled to domain 464, DWA 416 is coupled to domain 460, and DWA 418 is coupled is coupled to domain 468. The X Server is a type of resource server for handling various resources such as windowing features. A DWA (direct window access) is well known prior art process for allowing an application to directly manipulate the hardware of the display adapter without the need for an intervening device driver.

The remaining uncoupled graphics processes 420 are shown not coupled to any of the domains of the graphics adapter. If one of the uncoupled graphics processes wishes to utilize a domain for communications with the graphics adapter, then that unconnected graphic process must wait for one of the connected graphics processes to complete operations. For some processes, the RCM may be instructed to interrupt the communications between another process and the display adapter domain it is coupled to. In either case, the RCM may then couple the unconnected process to the open domain.

FIG. 5 is a block diagram of another host computer 600 utilizing a multiple domain display adapters 650 for rendering images. This example of the prior art is described in greater detail in patent application Ser. No. 07/480,183 filed Feb. 12, 1990, now abandoned, entitled "Rendering Context Manager for Display Adapters Supporting Multiple Domains", also referenced above. In host computer 600, graphics processes 612 and 614, of the set of graphics processes 610 being executed by the host computer processor, communicate with display adapter 650 and domains 660 and 662 when coupled to the display adapter and domains by RCM 630. In these communications, the graphics processes request the display adapter processor to execute functions 680 and 682. It is through executing these functions that display adapter 650 renders desired images on a display adapter.

In this example, X Server 612 and DWA 614 are shown coupled to the display adapter by the RCM. In this example of the prior art, domain 660 is for access to 2-D and resource management functions such as setting up the display adapter for a DWA and whereas second domain 662 is for access to 3-D functions. That is, if a graphics process requests a 3-D function such as a 3-D DWA, then the RCM couples that process to domain 662. If an unconnected graphics process 620 wishes to request a 3D function to be performed, then the unconnected graphics process must wait for DWA 614 to break communications or complete its processes with domain 662. The RCM may then couple the unconnected graphics process to domain 662, thereby allowing the process to request the display adapter to execute the desired 3-D function.

FIG. 6 is an illustration of another use of the system shown in FIG. 5. In this illustration, a DWA process 616 is shown coupled to both the 2-D and 3-D domains. The RCM may allow this to occur if the DWA process needs to utilize both 2-D and 3-D functions.

DISCLOSURE OF THE INVENTION

The present invention includes, in a multitasking data processing apparatus including means for executing processes and including a display adapter for executing functions supporting a display, the display adapter including a first port means for receiving, from the means for executing processes, requests to execute selected functions having a first execution priority, a second port means for concurrently receiving, from the means for executing processes, requests to execute selected functions having a second execution priority lower than the first execution priority, and means, coupled to the first and second port means, for executing selected functions according to the execution priority.

The present invention also includes, in a multitasking data processing apparatus including means for executing processes and including a display adapter for executing functions supporting a display, a method of executing processes including the steps of receiving from the means for executing processes in a first port means requests to execute selected functions, the requests having a first execution priority, concurrently receiving from the means for executing processes in a second port means requests to execute selected functions having a second execution priority lower than said first execution priority, and executing the selected functions according to the execution priority.

A better understanding of the nature and advantages of the present invention may be realized by reference to the remaining portions of the specification and the drawing.

BEST MODE FOR CARRYING OUT THE INVENTION

Figure 1:
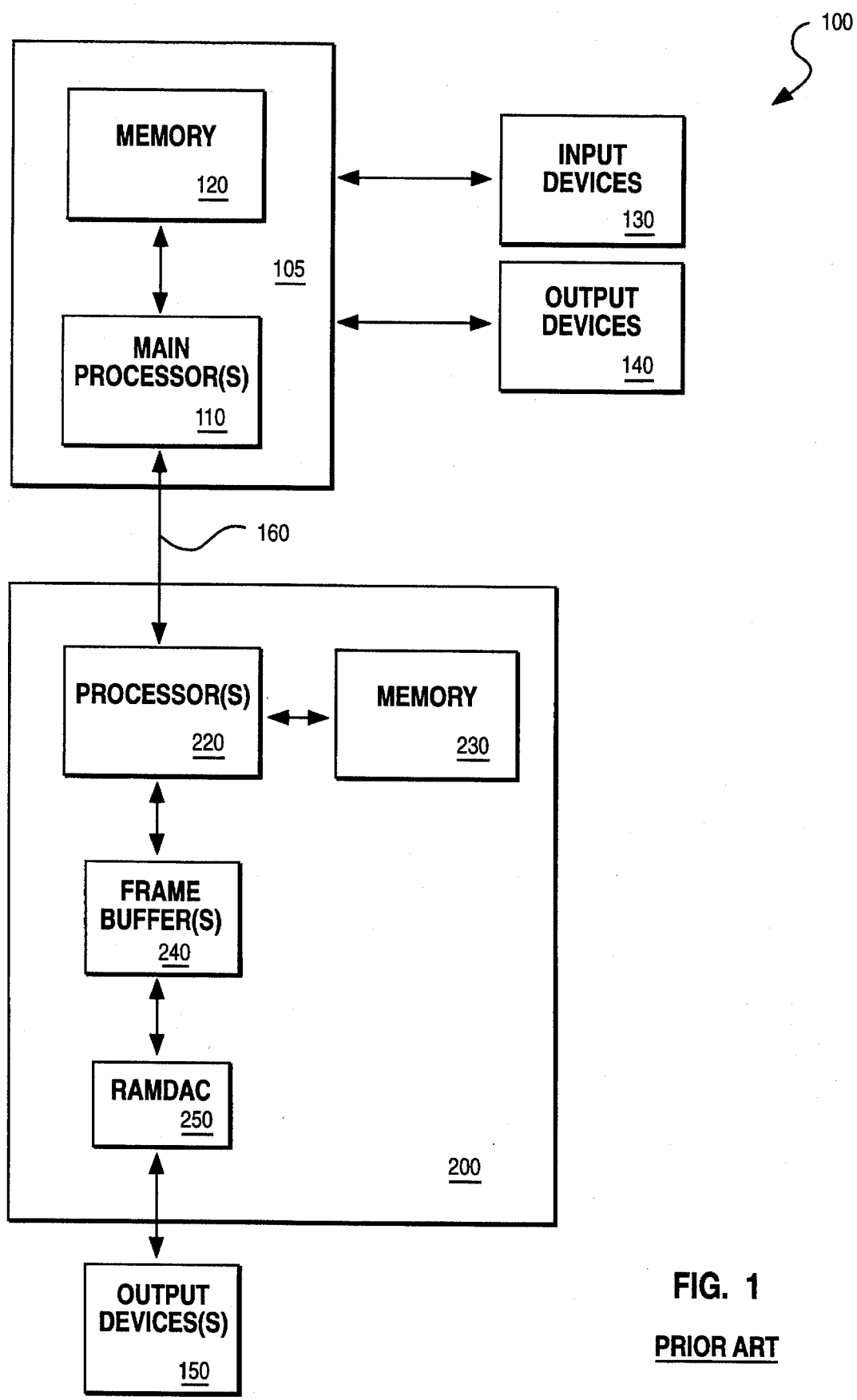
FIG. 1 is a block diagram of a typical digital computer utilizing a display adapter to render images.
Figure 2:
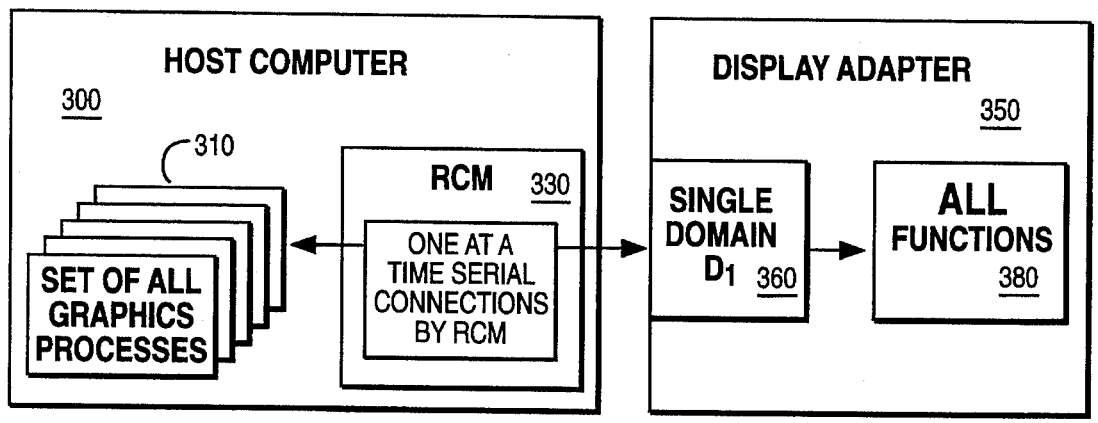
FIG. 2 is a block diagram of a host computer utilizing a single domain display adapter for rendering images.
Figure 3:
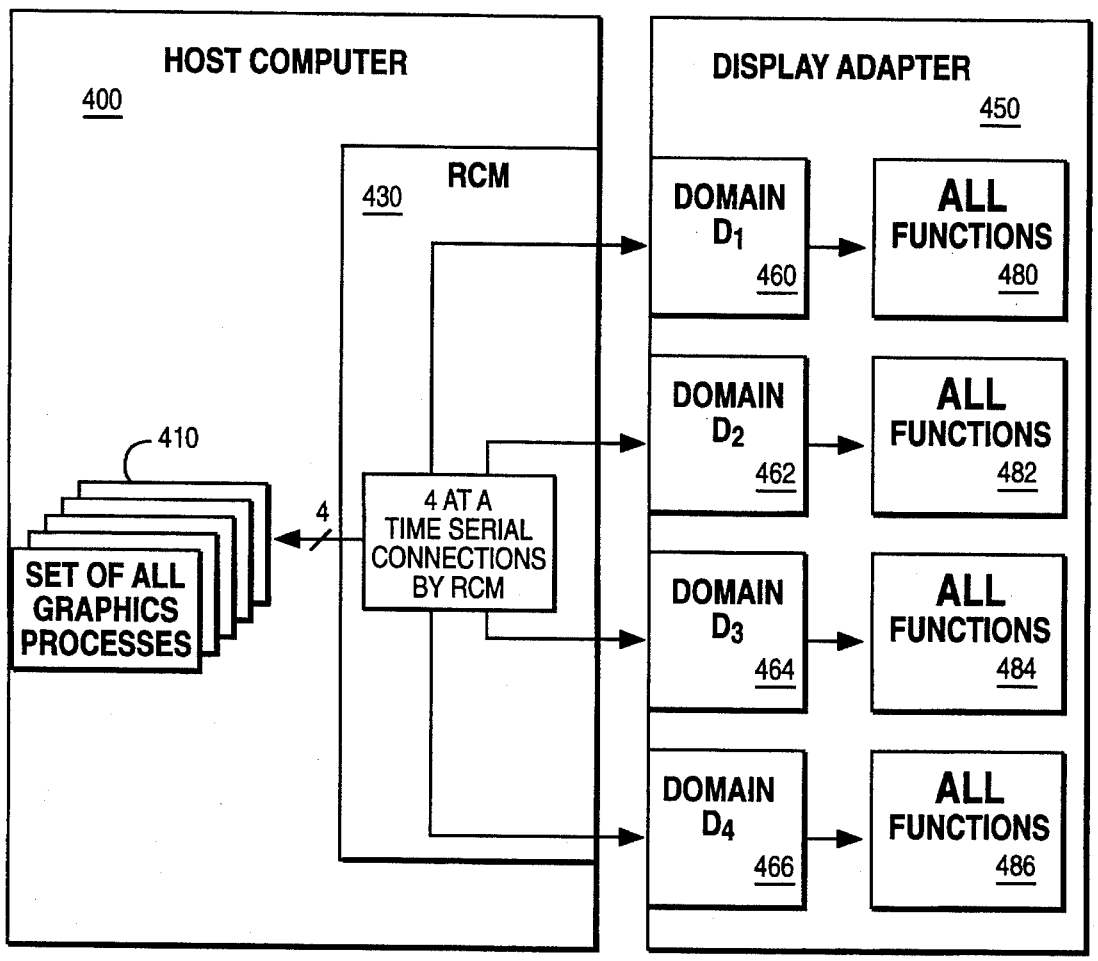
FIG. 3 is a block diagram of a host computer utilizing a multiple domain display adapter for rendering images.
Figure 4:
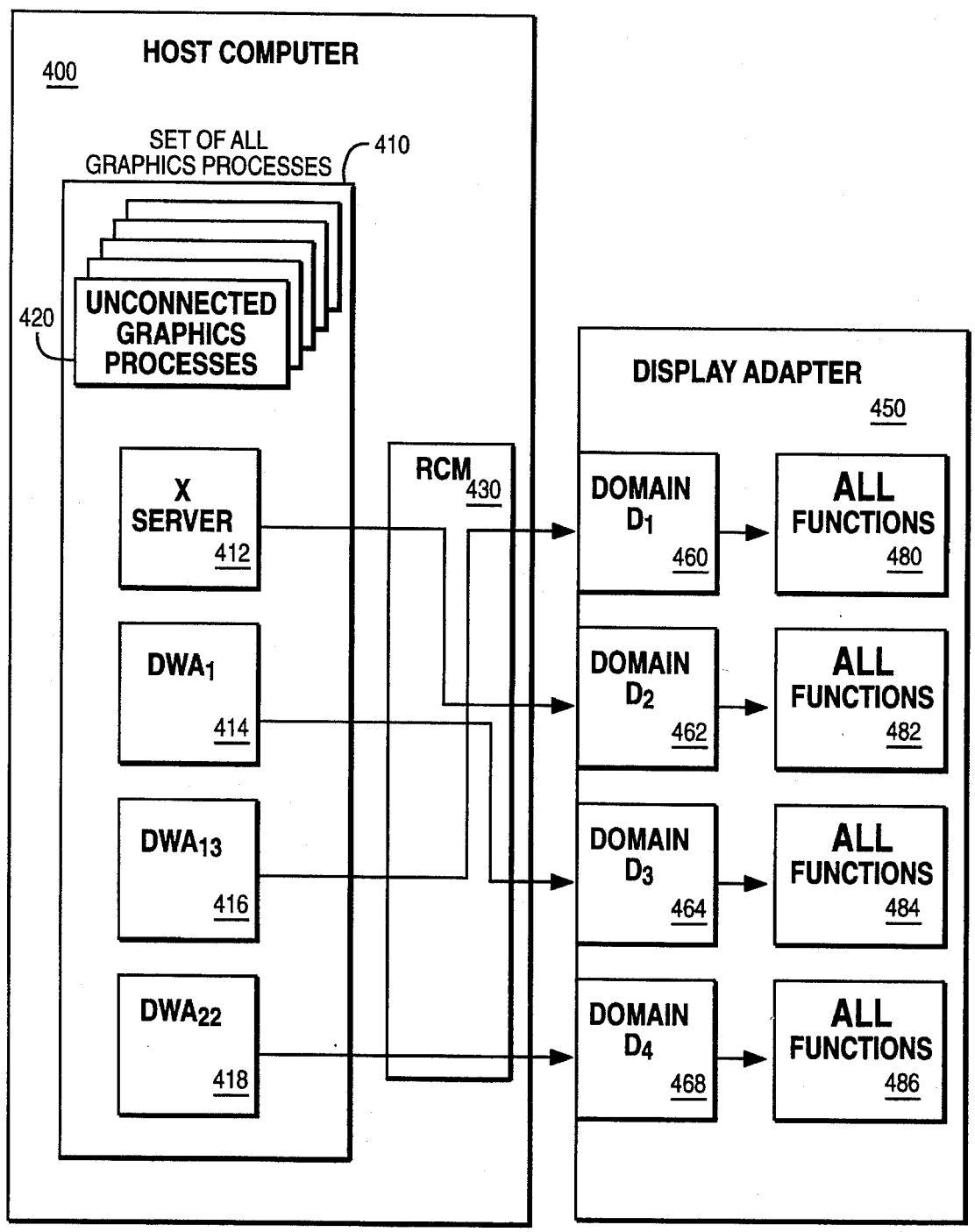
FIG. 4 is an illustration of a use of the system shown in FIG. 3.
Figure 5:
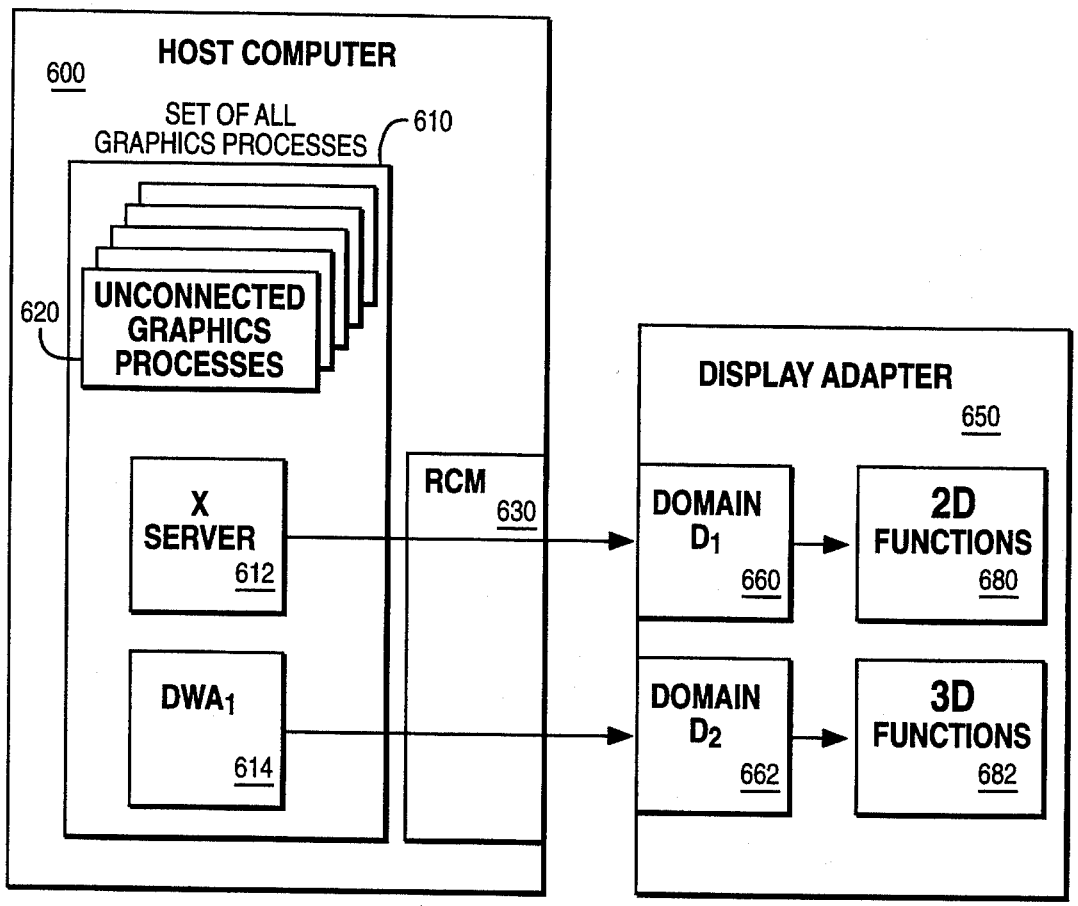
FIG. 5 is a block diagram of another host computer utilizing a multiple domain display adapter for rendering images.
Figure 6:
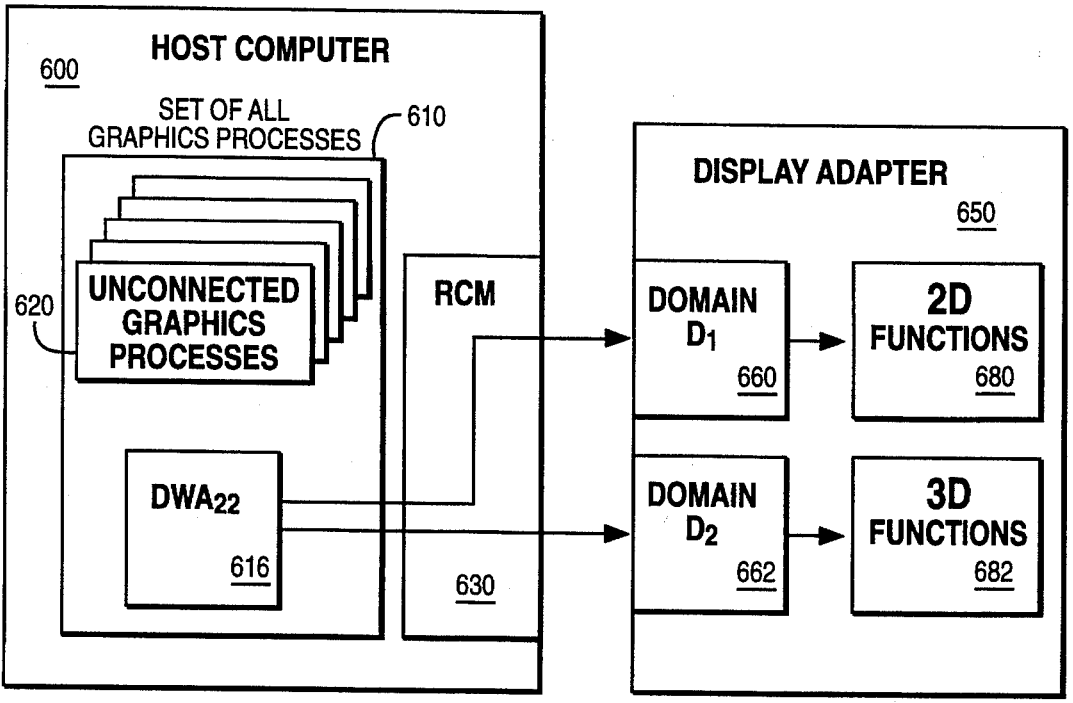
FIG. 6 is an illustration of another use of the system shown in FIG. 5.
Figure 7:
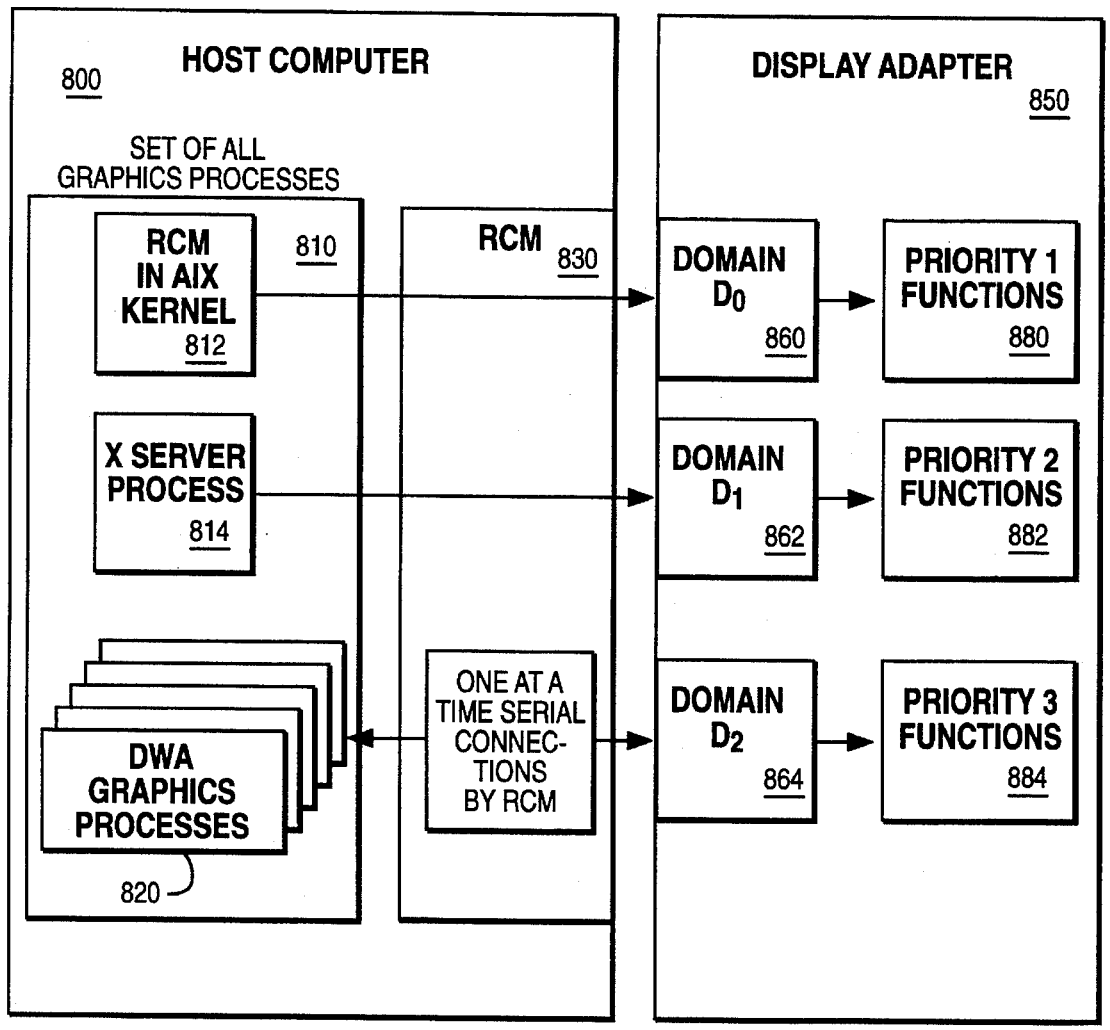
FIG. 7 is a block diagram of a host computer utilizing a preferred multiple domain display adapter.

FIG. 7 is a block diagram of a host computer 800 utilizing a preferred multiple domain display adapter 850. In host computer 800, a set of graphics processes 810 being executed by the host computer processor communicate with display adapter 850 and domains 860, and 864 when coupled to the domains by RCM 830. In these communications, the graphics processes request the display adapter processor to execute functions 880, 882 and 884. In the preferred embodiment, each domain is used to access functions based on the priority of those functions. For example, an RCM in AIX operating system kernel process 812, which requests high priority functions, is coupled to domain 860. Windowing system X Server process 814, which requests medium priority functions, is coupled to domain 862. Other graphics processes 820, which request standard or low priority functions, may be connected one at a time through the RCM to domain 864.

Figure 8:
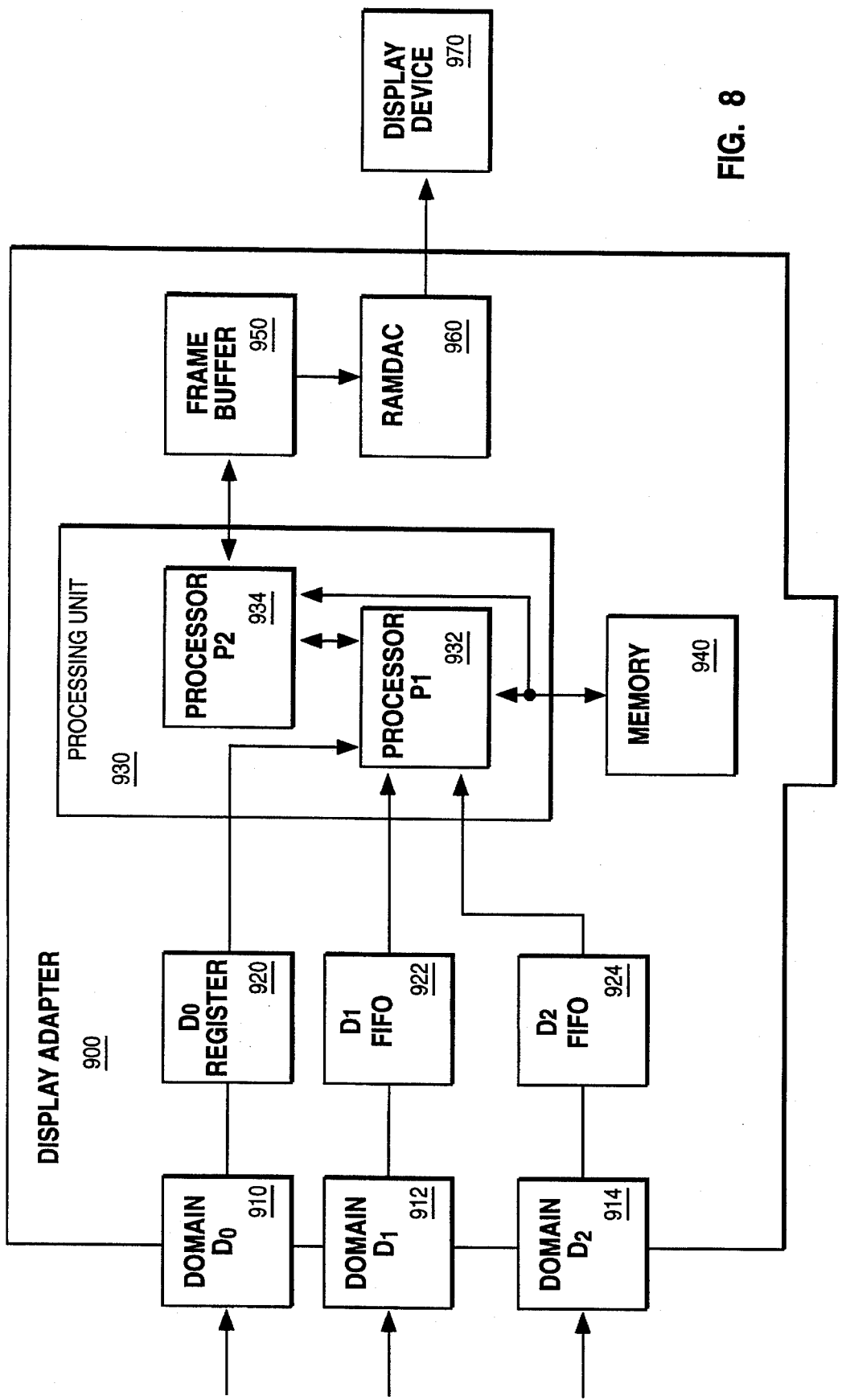
FIG. 8 is a detailed block diagram of the preferred display adapter.

FIG. 8 is a detailed block diagram of the preferred display adapter 900. The adapter includes domains 910, 912 and 914. Each of the domains is coupled to a buffer for storing incoming instructions and data on the domains. The storage means include D0 register 920, D1 FIFO (first in, first out) 922 and D2 924. Each of these buffers is coupled to a processing unit 930 which in the current example includes two processors 932 and 934 coupled in series. The processors communicate with memory 940. The processing unit then passes a rendered image to frame buffer 950 which is scanned periodically and the signals are sent through RAMDAC 960 to a display device 970.

The use of FIFOs in a display adapter is known in the art. An example is described in greater detail in patent application Ser. No. 07/480,181 filed Feb. 12, 1990, now abandoned, entitled "First-In/First-Out Buffer Queue Rendering Context Manager for Display Adapters Supporting Multiple Domains", also referenced above.

Figure 9:
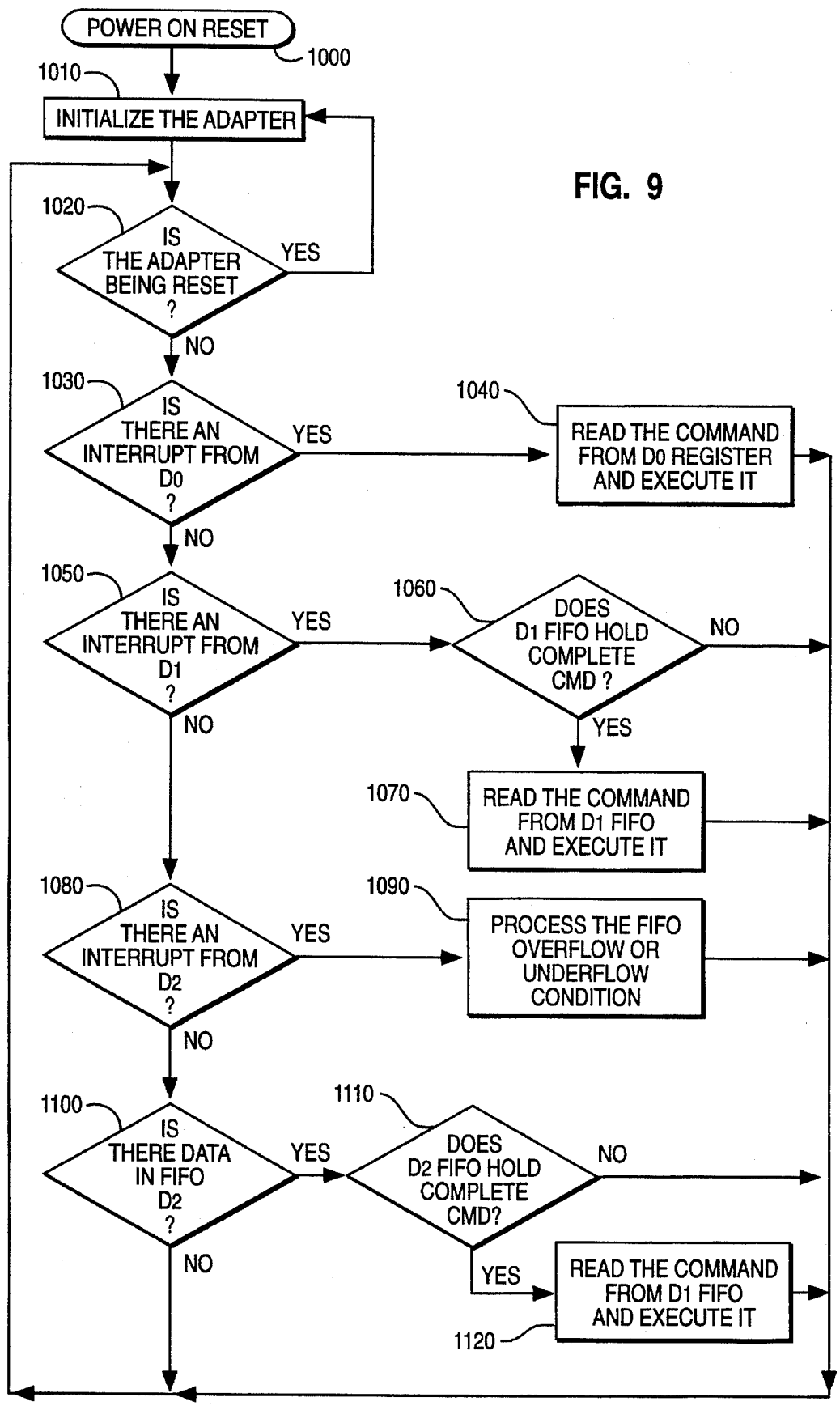
FIG. 9 is a flowchart illustrating the use of the preferred display adapter.

FIG. 9 is a flowchart illustrating the use of the preferred display adapter. In a first step 1000, the adapter is turned on or reset. In step 1010, the processing unit initializes the display adapter. This includes loading microcode into memory 940, clearing frame buffer 950 to a blank screen, and setting the timing of RAMDAC 960. In step 1020, the processing unit determines whether or not the adapter needs to be reset. This step allows the processes to cause full reinitialization of the display adapter. In step 1030, the processing unit determines whether it has received an interrupt signal from the D0 register indicating that request for executing a high priority function has been received. The processing unit may accomplish this by querying the D0 register. If yes, then the request is read from the D0 register and the appropriate function executed in step 1040, then executing returns to step 1040. Processing then returns to step 1020. If no to step 1030, then in step 1040 the processor determines whether it has received an interrupt signal from the D1 FIFO indicating that a request for executing a medium priority function has been received or has been waiting in the FIFO. If yes, then in step 1060 the processing unit determines whether that request in the D1 FIFO is complete. If yes, then the request is read and the appropriate function is executed in step 1070. Processing then returns to step 1020. If the D1 FIFO is not complete, then execution returns to step 1020. If the D1 FIFO is empty, then execution continues to step 1080. In step 1080, the processor determines whether it has received an interrupt signal from the D2 FIFO indicating that the FIFO requires any housekeeping functions. If yes, then in step 1090 the processing unit handles any needed FIFO housekeeping functions such as overflow or underflow conditions. Processing then continues to step 1020. If no to step 1080, then in step 1100 the processor determines whether the D2 FIFO contains a request for executing a standard or low priority function that has been received or has been waiting in the FIFO. If yes, then in step 1110 the processing unit determines whether that request in the D2 FIFO is complete. If yes, then the request is read and the appropriate function is executed in step 1120. Processing then returns to step 1010.

The prior art RCM in its interactions with the display adapter could not permit multiple application processes or server processes to simultaneously have access to the resources of the hardware at the same time. The restraint was not in the design of the RCM but rather in the designs of the hardware programming interface of the various display adapters. There are functions needed by the X Server process which are not ever needed by the application processes. For example, only the X Server manages the movement of the cursor, modifies the window geometry data structures, or manages the window clipping and window protection of the display adapter.

A similar inefficiency of design was seen in the organization of the domains of the display adapters. For example, a given domain was labelled the "2-D domain" and another domain was labelled the "3-D domain". In this case, there were often conflicts when the X Server attempted to access the 2-D domain for utilizing functions handling resource management operations at the same time that the DWA application processes attempted to access the 2-D domain for utilizing 2-D rendering functions.

The present invention has improved the efficiency of the RCM and the efficiency of the system of processes which interact with the RCM and the display device. There are three domains on the display device. The first domain has limited breadth of functions that it provides. These are functions requested, via the operating system kernel, by the RCM. These functions are given the highest execution priority due to the need for minimizing the time the kernel spends interacting with the display adapter at the expense of other processes. Similarly, to avoid race conditions between the X Server and the graphics processes, the RCM domain must process commands promptly, before control is returned to another process. This avoids complicated locking strategies between the RCM and the processes.

The second domain is generally available only to resource servers such as the X server. It may also sometimes be used by the operating system kernel for lower level functions. The functions for utilizing a mouse and for various windowing features are implemented in this domain.

The third domain is widely available to all applications. It exposes all of the drawing or rendering functions and other graphics functions. Where there are functions, such as manipulating the shape of the cursor, that are used by both the graphics processes and the X Server, then those functions are available in both domains. However, the same function requested in another domain will have a different execution priority. Having the commands available in both domains reduces the need for either the X Server or the application processes from needing to gain access to the other's domain. Not accessing an additional domain substantially decreases the number of times that time consuming operations such as graphics faults and their resultant context switches are invoked. The display of images is measured by the rate of drawing per unit time. The host computer processors bus, and other resources spent handling graphics faults detracts substantially from the resources available for performing graphics. This is perceived by the customer as sluggish response when multiple processes are executing, and can lead to cases of thrashing between the X Server and the other processes in certain situations in the prior art. The present inventions substantially reduces the causes of and the probability of such thrashing or reduced performance.

An improvement in the present invention comes from the reduction in the need to lock domains and/or the adapter. There are cases, such as when the X Server is moving a DWA window from one location of the display screen to another, in which the X Server sends many sequences of commands to the RCM. Such cases occur when there are many window geometries present and the relative shape and display priority of the windows is changing. In prior art, the X Server locked the adapter while it performed the move and related operations. In the present invention, since a domain is specifically matched to the needs of the X Server, the lock placed by the X Server is never contested. Since all graphics DWA applications processes are drawing to a different domain and need no access to the domain of the X Server, and since the X Server needs no access to other domains, and since there is no conflict due to locked resources, the user perceives a smooth and continued rate of drawing performance in the DWA windows. In the prior art, the user would see a jerky or suspended rate of drawing performance, as the X Server locked the domain(s) and managed the window geometries.

Figure 10:
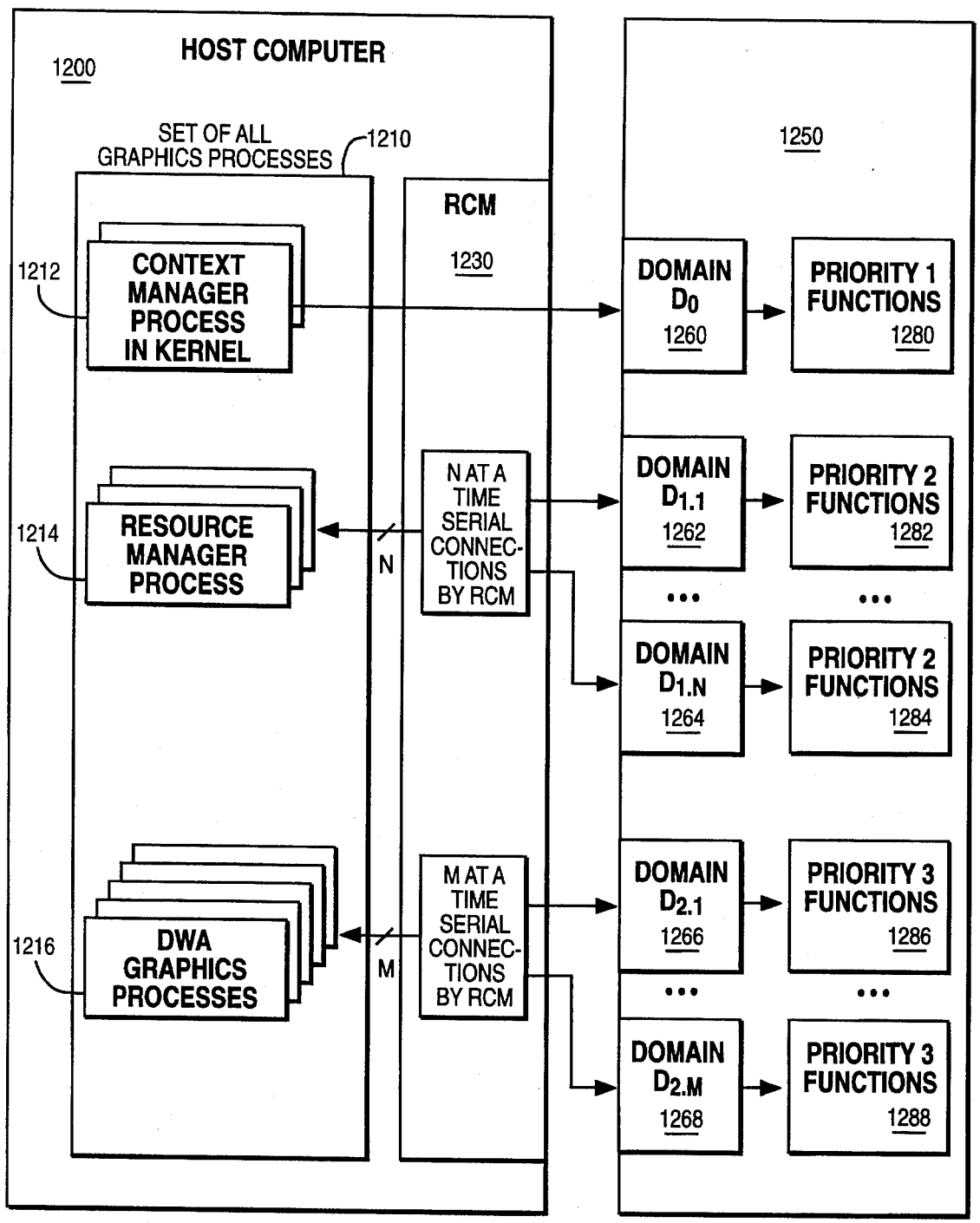
FIG. 10 is a block diagram illustrating an alternative system which may be utilized to embody the present invention.

FIG. 10 is a block diagram illustrating an alternative systems which may be utilized to embody the present invention. In host computer 1200, a set of graphics processes 1210 being executed by the host computer processor communicate with display adapter 1250 and domains 1260, 1262–1264, and 1266–1268 when coupled to the domains by RCM 1230. In these communications, the graphics processes request the display adapter processor to execute functions 1280, 1282–1284, and 1286–1288. Graphics processes 1210 may include multiple context managers 1210, multiple resource managers 1212, and multiple graphics processes 1216. RCM 1230 provides communications from the various levels of graphics processes to the various levels of priority functions in the various domains. The display adapter includes domain 1260 for requests from context managers, such as the AIX kernel, which would utilize high priority functions 1280. Also included are domains 1262–1264 for requests from resource managers, such as an X server, which would utilize medium priority functions 1282–1284. In addition, domains 1266–1268 are included for requests from processes, such as a 3-D graphics process, which would utilize low priority functions 1286–1288.

Although the present invention has been fully described above with reference to specific embodiments, other alternate embodiments may be apparent to those of ordinary skill in the art. For example, other processes such as image processing processes or video display and capture processes may utilize the display adapter. In addition, more than three priority levels may be utilized. Therefore, the above description should not be taken as limiting the scope of the present invention which is defined by the appended claims.

We claim:

1. In a multitasking data processing apparatus including a common means for executing processes and including a display adapter for executing functions supporting a display, said display adapter comprising:

a) a first port means for receiving, from said common means for executing processes, requests to execute selected functions having a first execution priority;

b) a second port means for concurrently receiving, from said common means for executing processes, requests to execute selected functions having a second execution priority lower than said first execution priority;

c) a third port means for concurrently receiving, from said means for executing processes, requests to execute selected functions having a third execution priority lower than said second execution priority;

d) a first and second port buffer means for storing said first and second port requests; and e) processing means, coupled to said first and second port means, for executing said selected functions in response to said concurrently received requests from said common means for executing processes according to said execution priority based on which port means received said concurrently received requests, said processing means further including means for selecting said selected functions for execution according to said execution priority.

2. The apparatus of claim 1 wherein said display adapter further comprising a third port buffer means for storing said third port requests.

3. The apparatus of claim 2 wherein said second port means includes a first address domain and said third port means includes a second address domain.

4. The apparatus of claim 3 wherein said first port means includes a third address domain.

5. The apparatus of claim 4 wherein said processing means includes a plurality of processors.

6. In a multitasking data processing apparatus including a common means for executing processes and including a display adapter for executing functions supporting a display, a method of executing processes comprising the steps of:

a) receiving, from said common means for executing processes in a first port means, requests to execute selected functions, said requests having a first execution priority;

b) concurrently receiving from said common means for executing processes in a second port means requests to execute selected functions having a second execution priority lower than said first execution priority;

c) concurrently receiving from said common means for executing processes in a third port means requests to execute selected functions having a third execution priority lower than said second execution priority;

d) storing said first and second port requests in a first and second port buffer means, respectively;

e) executing said selected functions in response to said concurrently received requests from said common means for executing processes according to said execution priority based on which porn means received said concurrently received requests in a processing means coupled to said first and second port means; and f) selecting said selected functions for execution according to said execution priority.

7. The method of claim 6 further comprising the step of storing said third port requests in a third port buffer means.

8. The method of claim 7 wherein the step of receiving requests in a first port means includes receiving requests from an exclusive one of said plurality of processes being executed on said means for executing processes.

9. A data processing system comprising:

a) a multitasking host computer including a common means for executing processes by selecting selected functions for execution according to execution priority; and b) a display adapter, coupled to said host computer, for executing functions supporting a display, said display adapter including:

i) a first port means for receiving, from said common means for executing processes, requests to execute selected functions having a first execution priority;

ii) a second port means for concurrently receiving, from said common means for executing processes, requests to execute selected functions having a second execution priority lower than said first execution priority;

iii) a third port means for concurrently receiving from said processes requests to execute selected functions having a third execution priority lower than said second execution priority;

iv) a first and second port buffer means for storing said first and second port requests, respectively; and v) processing means, coupled to said first and second port means, for executing said selected functions in response to said concurrently received requests from said common means for executing processes according to said execution priority based on which port means received said concurrently received requests.

10. The system of claim 9 wherein said display adapter further includes a third port buffer means for storing said third port requests.

11. The system of claim 10 wherein said first port means includes means for receiving requests from an exclusive one of said plurality of processes.

12. The system of claim 11 wherein said second port means includes a first address domain and said third port means includes a second address domain.

13. The system of claim 12 wherein said first port means includes a third address domain.

14. The system of claim 13 wherein said processing means includes a plurality of processors.

* * * * *